United States Patent [19]

Ferrini et al.

[11] 3,926,961
[45] Dec. 16, 1975

[54] SULPHAMOYLBENZOIC ACID AMIDES

[75] Inventors: Pier Giorgio Ferrini, Binningen; Georges Haas; Alberto Rossi, both of Oberwil, all of Switzerland

[73] Assignee: Ciba-Geigy Corporation, Ardsley, N.Y.

[22] Filed: June 27, 1974

[21] Appl. No.: 483,741

[30] Foreign Application Priority Data
July 10, 1973 Switzerland.................... 10019/73

[52] U.S. Cl............................ 260/239.7; 424/229
[51] Int. Cl.². C07D 237/00; C07D 239/00; C07D 251/00; C07D 265/00
[58] Field of Search......... 260/239.6, 239.7, 239.75, 260/239.65; 424/229

[56] References Cited
UNITED STATES PATENTS

| 2,910,488 | 10/1959 | Novello............................ 260/239.6 |
| 3,444,177 | 5/1969 | Schmidt et al................... 260/239.7 |

FOREIGN PATENTS OR APPLICATIONS

| 25,98M | 5/1963 | France............................ 260/239.6 |
| 2,001,158 | 7/1970 | Germany |

Primary Examiner—Albert T. Meyers
Assistant Examiner—D. W. Robinson
Attorney, Agent, or Firm—Joseph G. Kolodny; John J. Maitner; Theodore O. Groeger

[57] ABSTRACT

2-Amino-5-sulphamoyl-benzoic acid amides of the general formula

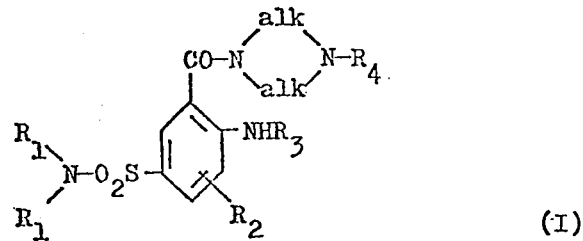

wherein $R_1$ denotes lower alkyl, $R_2$ denotes hydrogen, halogen, trifluoromethyl, lower alkyl or lower alkoxy, $R_3$ denotes hydrogen, hydroxyl or lower alkyl, $R_4$ denotes aryl-lower alkyl or aryl-lower alkenyl optionally interrupted in the aliphatic part, by a hetero-atom and alk denotes lower alkylene which separates the nitrogen atoms by 2 or 3 C atoms, which are useful as analgesic in condition of pain of the most diverse etiology.

17 Claims, No Drawings

SULPHAMOYLBENZOIC ACID AMIDES

The invention relates to new 2-amino-5-sulphamoyl-benzoic acid amides of the general formula

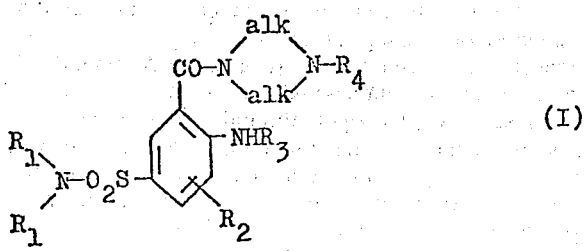

wherein $R_1$ denotes lower alkyl, $R_2$ denotes hydrogen, halogen, trifluoromethyl, lower alkyl or lower alkoxy, $R_3$ denotes hydrogen, hydroxyl or lower alkyl, $R_4$ denotes aryl-lower alkyl or aryl-lower alkenyl optionally interrupted, in the aliphatic part, by a hetero-atom and alk denotes lower alkylene which separates the nitrogen atoms by 2 or 3 C atoms, and to processes for their manufacture.

In the preceding and following text, "lower" radicals are above all to be understood as radicals which contain 1 to 7, above all 1 to 4, C atoms.

The radicals $R_1$ and alk can respectively be identical or different.

Lower alkyl $R_1$, $R_2$ and $R_3$ in particular contains 1 to 7, above all 1 to 4, C atoms and is thus, in particular, straight or branched heptyl, hexyl or pentyl bonded in any desired position, or above all n-, sec.- or tert.-butyl, isobutyl, isopropyl, n-propyl or especially ethyl or methyl.

Halogen $R_2$ is, in particular, fluorine, bromine or above all chlorine.

Lower alkoxy $R_2$ in particular contains 1 to 7, above all 1 to 4, C atoms and is thus, in particular, straight or branched heptyloxy, hexyloxy or pentyloxy bonded in any desired position, or, above all, n-, sec.- or tert.-butoxy, isobutoxy, isopropoxy, n-propoxy or especially ethoxy or methoxy.

In aryl-lower alkyl or aryl-lower alkenyl $R_4$ which is optionally interrupted by a hetero-atom, the aryl radical is, in particular, phenyl which is optionally monosubstituted or polysubstituted by lower alkyl, lower alkoxy, halogen and/or trifluoromethyl, or pyridyl or thienyl, optionally substituted by lower alkyl and/or lower alkoxy at one or more C atoms.

In aryl-lower alkyl or aryl-lower alkenyl $R_4$, the aliphatic part in particular contains 1 to 6, above all 1 to 4, C atoms and can be straight-chain or branched, preferably in the 1- or 2-position, and bonded in any desired position. Examples of preferred aryl-lower alkyl or aryl-lower alkenyl radicals $R_4$ are above all arylmethyl, 2-aryl-1-methyl-ethyl, 3-arylprop-2-enyl, 3-arylpropyl, 2-aryl-2-methyl-ethyl and 2-arylethyl, possible aryl radicals being in each case, in particular, phenyl, pyridyl or thienyl which are optionally substituted as above, and specifically 2-methyl-2-phenylethyl, 3-phenylpropyl, 2-(p-chlorophenyl)-ethyl, 2-(p-methoxyphenyl)-ethyl, 3-phenylprop-2-enyl, 2-(2-, 3- or 4-pyridyl)-ethyl, 3-(2-pyridyl)-propyl or 3-(3-pyridyl)-propyl, benzyl and 2-phenylethyl.

In aryl-lower alkyl or aryl-lower alkenyl $R_4$ interrupted, in the aliphatic part, by a hetero-atom, the aliphatic part which contains the hetero-atom in particular contains 1 to 5, above all 1 to 3, C atoms and, as hetero-atoms, in particular oxygen or optionally monooxodised or di-oxodised sulphur and can be straight-chain or branched at a C atom, and be bonded at any desired C atom. Examples of preferred aryl-lower alkyl or aryl-lower alkenyl radicals $R_4$ interrupted, in the aliphatic part, by one of the hetero-atoms mentioned are 3-aryloxypropyl, 3-arylthiopropyl, 3-arylsulphinylpropyl and 3-arylsulphonylpropyl as well as 2-aryloxyethyl, 2-arylthioethyl, 2-arylsulphinylethyl and 2-arylsulphonylethyl, possible aryl radicals being in each case, in particular, pyridyl, thienyl or above all phenyl, which are optionally substituted as indicated above, and specifically β-phenoxyethyl, β-phenylthioethyl, β-phenylsulphinylethyl and β-phenylsulphonylethyl.

The radicals alk can be straight-chain or branched and optionally contain 1 to 7, in particular 1 to 4, C atoms in the side chain. The following may be mentioned as examples: Nonylene, octylene, heptylene, hexylene, pentylene, 3-methylbutylene and isobutylene-1,3 and above all isobutylene-1,2, butylene-2,3 and, in particular, propylene-1,3 and especially butylene-1,2, propylene-1,2 and ethylene.

The new 2-amino-5-sulphamoyl-benzoic acid amides possess valuable pharmacological properties. Thus they display, in particular, a distinct anti-inflammatory action, such as can be shown, for example, in the turpentine pleurisy test on rats, on peroral administration of a dose of 10 to 300 mg/kg, and above all a distinct antinociceptive (analgesic) action, such as can be shown, for example, in the acetic acid and benzoquinone writhing test on mice, on peroral administration of a dose of 30 to 300 mg/kg. They are furthermore distinguished by a comparatively low toxicity, as can be shown, for example, on peroral administration to rats. The new 2-amino-5-sulphamoyl-benzoic acid amides therefore are useful as analgesics in conditions of slight to medium pain of the most diverse etiology.

The invention above all relates to those 2-amino-5-sulphamoyl-benzoic acid amides of the formula I, wherein $R_1$ denote identical lower alkyl groups with 1 to 4 C atoms, such as methyl or ethyl, $R_2$ denotes hydrogen, or halogen up to atomic number 17, such as fluorine or chlorine, $R_3$ denotes hydrogen, hydroxyl or lower alkyl with 1 to 4 C atoms, such as isopropyl, n-propyl or above all ethyl or methyl, $R_4$ denotes phenyl-lower alkyl or phenyl-lower alkenyl optionally monosubstituted or polysubstituted in the phenyl part by lower alkyl, lower alkoxy, halogen and/or trifluoromethyl, or pyridyl- or thienyl-lower alkyl or -lower alkenyl optionally substituted by lower alkyl and/or lower alkoxy at one or more C atoms in the pyridyl or thienyl part, all these $R_4$ radicals having 1 to 6 C atoms in the aliphatic part, and alk denotes alkylene with 2 to 4 C atoms, such as butylene-2,3, butylene-1,2, propylene-1,2 or propylene-1,3 or above all ethylene.

In particular, however, the invention relates to those 5-sulphamoyl-anthranilic acid amides of the formula I wherein $R_1$ is methyl, $R_2$ is chlorine, methoxy, methyl or above all hydrogen, $R_3$ is hydrogen or lower alkyl with 1 to 4 C atoms, such as ethyl or methyl, $R_4$ is phenyl-lower alkyl or phenyl-lower alkenyl optionally monosubstituted or polysubstituted by lower alkyl, lower alkoxy, halogen and/or trifluoromethyl, or pyridyl- or thienyl-lower alkyl or -lower alkenyl optionally substituted by lower alkyl and/or lower alkoxy at one or more C atoms in the pyridyl or thienyl part, all these $R_4$ radicals having 1 to 5, above all 1 to 4, C atoms in the aliphatic part, and alk denotes 1,2-alkylene with 2 to 4 C atoms, such as butylene-1,2, propylene-1,2 or, above all, ethylene.

Very particularly, the invention however relates, amongst the abovementioned 5-sulphamoyl-anthranilic acid amides of the formula I, to those wherein $R_1$ is methyl, $R_2$ is hydrogen, $R_3$ is hydrogen, ethyl or methyl, $R_4$ denotes $R_5$-methyl, 2-$R_5$-ethyl, 2-methyl-2-$R_5$-ethyl, 3-$R_5$-propyl or 3-$R_5$-prop-2-enyl, wherein $R_5$ is phenyl which is optionally monosubstituted or polysubstituted in the phenyl part by lower alkyl, lower alkoxy, halogen and/or trifluoromethyl or pyridyl which is optionally substituted at one or more C atoms in the pyridyl part by lower alkyl and/or lower alkoxy, and alk denotes propylene-1,2 or, above all, ethylene.

Specifically, however the invention relates, amongst the abovementioned 5-sulphamoyl-anthranilic acid amides of the formula I, to those wherein $R_1$ is methyl, $R_2$ is hydrogen, $R_3$ is hydrogen or ethyl, $R_4$ is $R_5'$-methyl, 2-$R_5'$-ethyl, 2-methyl-2-$R_5'$-ethyl, 3-$R_5'$-propyl or 3-$R_5'$-prop-2-enyl, wherein $R_5'$ is phenyl which is optionally halogenated, such as chlorinated or fluorinated, or lower alkoxylated, such as methoxylated, these substituents being above all in the m- or p-position, or denotes pyridyl, and alk is ethylene, and specifically the 2-amino-5-sulphamoyl-benzoic acid amides of the general formula I which are mentioned in the examples.

The new 2-amino-5-sulphamoyl-benzoic acid amides can be obtained according to processes which are in themselves known.

Thus it is possible, for example, to manufacture 2-amino-5-sulphamoyl-benzoic acid amides of the formula I, wherein $R_3$ is hydrogen or hydroxyl, by reducing the nitro group in a 2-nitro-5-sulphamoylbenzoic acid amide of the formula II

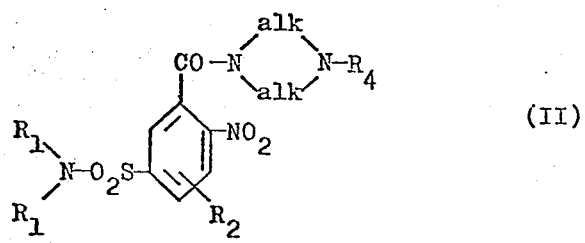

(II)

wherein $R_1$, $R_2$, $R_4$ and alk have the indicated meanings.

The reduction of the nitro group can be carried out in a manner which is in itself known, and has in particular been described for analogous reactions, such as with nascent hydrogen, for example generated by the action of a strong acid, such as a hydrogen halide acid, above all hydrochloric acid, sulphuric acid or a lower aliphatic carboxylic acid, such as acetic acid, on base metals, such as iron, zinc, magnesium or aluminium, or with a suitable light metal hydride, such as lithium borohydride or above all sulphurised sodium borohydride, or with hydrogen in the presence of a suitable hydrogenation catalyst, such as palladium on charcoal, platinum oxide or Raney nickel or Rupe nickel, in a solvent which is inert under the hydrogenation conditions, if necessary under elevated pressure and/or at elevated temperature.

The nitro group can be reduced either to the hydroxyamino group or as far as the primary amino group, depending on the reaction conditions. Thus, the reduction with nascent hydrogen in neutral or weakly acid solution, and the reaction with hydrogen at room temperature under normal pressure in the presence of 10 percent strength palladium on charcoal, with discontinuation of the hydrogenation after 2 equivalents of hydrogen have been taken up, give predominantly 2-hydroxyamino-5-sulphamoyl-benzoic acid amides. In contrast, 5-sulphamoyl-anthranilic acid amides are obtained under drastic conditions, for example with nascent hydrogen in mineral acid solution or with hydrogen under elevated pressure and/or at elevated temperature or above all when using Rupe nickel as the catalyst.

However, the new 2-amino-5-sulphamoyl-benzoic acid amides can also be manufactured by reacting a 5-sulphamoyl-isatoic anhydride of the formula III

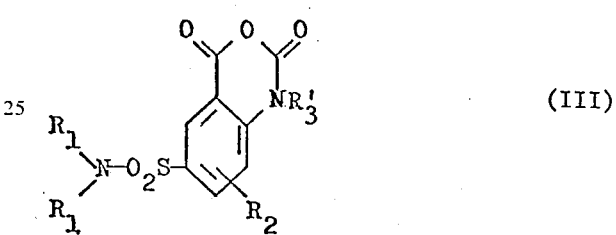

(III)

wherein $R_1$ and $R_2$ have the indicated meanings and $R_3'$ denotes hydrogen or lower alkyl, with an amine of the formula IC

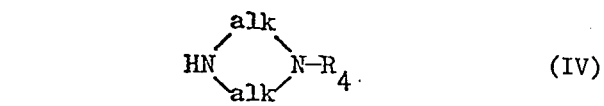

(IV)

wherein alk and $R_4$ have the indicated meanings.

The reaction with the amine of the formula IV can be carried out in a manner which is in itself known, if necessary in the presence of a solvent and/or of a condensation agent, especially a basic condensation agent, and advantageously at elevated temperature.

Further, the new 5-sulphamoyl-anthranilic acid amides can be manufactured by solvolytically splitting off X from a 5-sulphamoyl-anthranilic acid amide of the formula V

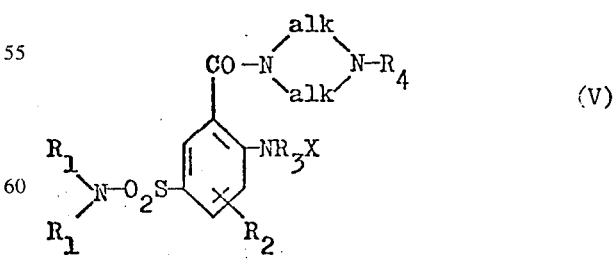

(V)

wherein $R_1$, $R_2$, $R_3$, $R_4$ and alk have the indicated meanings and X denotes an acyl radical, such as optionally functionally modified carboxyl groups, for example oxycarbonyl radicals, such as alkoxycarbonyl radicals, for example the tert.-butoxycarbonyl radical, an arylsulphonylethoxycarbonyl radical, such as the benzenesulphonylethoxycarbonyl radical, an arylthioethoxycarbonyl radical, such as the phenylthioethoxycarbonyl radical, or the ethoxycarbonyl radical, aralkoxycarbonyl radicals, such as phenyl-lower alkoxycarbonyl radicals, for example a carbobenzoxy radical, halogenocarbonyl radicals, for example the chlorocarbonyl radical, and also arylsulphonyl radicals, such as toluenesulphonyl or bromobenzenesulphonyl radicals, and optionally halogenated, such as fluorinated, lower alkanoyl radicals, for example the formyl, acetyl or trifluoroacetyl radical, or an aroyl radical, such as a benzoyl radical, or the nitrile group, the sulphinyl radical or silyl radicals, such as the trimethylsilyl radical.

The solvolysis is carried out in the usual manner, for example in the presence of hydrolysing agents, for example in the presence of acid agents, such as, for example, of an aqueous mineral acid, such as sulphuric acid or a hydrogen halide acid, or of an organic acid, for example a suitable carboxylic acid, such as an α-halogenoalkanecarboxylic acid, for example trifluoroacetic acid or chloroacetic acid, or an organic sulphonic acid, for example benzenesulphonic acid or toluenesulphonic acid, or of acid ion exchangers, or in the presence of basic agents, for example alkali metal hydroxides, such as sodium hydroxide. Oxycarbonyl radicals, arylsulphonyl radicals and nitrile groups can advantageously be split off by acid agents, such as by a hydrogen halide acid. For example, splitting off by means of aqueous hydrochloric acid, optionally mixed with acetic acid, is particularly suitable for this purpose. Furthermore it is possible to split off, for example, a tert.-butoxycarbonyl radical under anhydrous conditions by treatment with a suitable acid, such as trifluoroacetic acid.

In resulting 2-amino-5-sulphamoyl-benzoic acid amides substituents can be introduced, modified and split off, within the scope of the definition of the end products.

Thus, for example, it is possible to introduce halogen in the usual manner into resulting 2-amino-5-sulphamoylbenzoic acid amides which contain aromatically bonded hydrogen atoms, for example by reaction with chlorine or bromine, preferably in the presence of a catalyst, such as iron-(III) chloride, or by reaction with N-chlorosuccinimide. Further, trifluoromethyl can be introduced in the usual manner, for example by reaction with trifluoroiodomethane in the presence of metals, such as copper powder. In addition, lower alkyl can be introduced in the usual manner, for example by reaction with a lower alkyl halide, advantageously in the presence of a catalyst, such as a metal halide, for example aluminium chloride or aluminium bromide.

In resulting 5-sulphamoyl-anthranilic acid amides of the formula I, wherein $R_3$ is hydrogen, it is furthermore possible to introduce lower alkyl groups $R_3$ in the usual manner, for example by reaction with a customary alkylating agent, such as a reactive ester of an alcohol of the formula $R_3$-OH, for example with an organic sulphonic acid, such as with benzenesulphonic acid, p-bromobenzenesulphonic acid, toluenesulphonic acid or methanesulphonic acid, or with an inorganic sulphonic acid, such as with fluorosulphonic acid, or with a strong inorganic acid, such as with hydrochloric acid, hydrobromic acid, hydriodic acid or sulphuric acid, or by reaction with a corresponding onium salt, for example with a tri-lower alkyloxonium tetrafluoborate or with a di-lower alkyl-iodonium iodide.

The reactions with such reactive esters are preferably carried out in the presence of an acid-binding agent, such as a tertiary organic base, for example ethyldiisopropylamine, pyridine or quinoline, or of an inorganic base, such as an alkali metal hydroxide or alkaline earth metal hydroxide or an alkali metal carbonate, for example sodium hydroxide, potassium hydroxide or calcium hydroxide or potassium carbonate or sodium carbonate. Preferably, the alkylation measures described above are carried out in an inert organic solvent, such as a hydrocarbon, for example in benzene, toluene or xylene, or, in the case of the reaction with reactive esters, for example, in an ether, such as diethyl ether, tetrahydrofurane or dioxane, or, in the case of the reaction with onium salts, in a chlorinated or nitrated hydrocarbon, for example in methylene chloride, carbon tetrachloride, nitrobenzene or nitromethane.

However, the alkylation can also be effected by reaction with a corresponding oxo compound, for example with a corresponding aldehyde or ketone under reducing conditions, for example in the presence of hydrogen, suitably in the presence of a hydrogenation catalyst, such as a palladium, platinum or nickel catalyst, for example palladium on charcoal or on calcium carbonate, platinum oxide or Raney nickel, under normal or, preferably, elevated pressure, or in the presence of a hydrogen donor, such as one of those mentioned, for example lithium aluminium hydride, sodium cyanoborohydride, or sodium borohydride, in each case advantageously in a solvent which is inert under the reduction conditions. For example, it is particularly advantageous to introduce a methyl group by heating the compound which is to be methylated with a mixture of formaldehyde and formic acid, for example for 1 to 24 hours to temperatures between approx. 60° and 120°C, and preferably to the reflux temperature of the reaction mixture. The formaldehyde can also be employed in the form of a formaldehyde donor, for example as paraformaldehyde or as an aqueous solution. In a preferred embodiment, for example, paraformaldehyde in 90 percent strength formic acid, or approx. 30 percent strength aqueous formaldehyde solution/80 percent strength formic acid is used.

Resulting 2-hydroxyamino-5-sulphamoyl-benzoic acids can furthermore be reduced in the customary manner to the corresponding 5-sulphamoyl-anthranilic acid amides, for example by treatment with sufficiently strong reducing agents such as nascent hydrogen, generated, for example, by the reaction of a strong acid, such as a hydrogen halide acid, above all hydrochloric acid, sulphuric acid or a lower aliphatic carboxylic acid, such as acetic acid, on base metals, such as iron, zinc, magnesium or aluminium, or by means of a suitable light metal hydride, such as lithium borohydride or above all sulphurised sodium borohydride, or by means of hydrogen in the presence of a suitable hydrogenation catalyst, for example Rupe nickel or Raney nickel or platinum oxide, preferably under elevated pressure.

In the above reductions care must be taken, where relevant, that further reducible groups are not attacked. Thus care must be taken in particular in the case of the reduction with Raney nickel and hydrogen that any α-aryl-lower alkyl or alkenyl radicals $R_4$ and/or halogen atoms bonded to aromatic rings are not replaced by hydrogen. If necessary, the hydrogen uptake should be followed volumetrically and the hydrogenation discontinued when the calculated amount has been taken up. Furthermore, the 5-(di-lower alkylsulphamyl) group requires consideration in the case of all the reductions, but especially with complex hydrides.

The reactions mentioned can optionally be carried out simultaneously or successively and in optional sequence.

The reactions mentioned are carried out in the usual manner in the presence or absence of diluents, condensation agents and/or catalytic agents, at lowered, ordinary or elevated temperature, and if necessary in a closed vessel.

Depending on the process conditions and starting materials, the end products are obtained in the free form or in the form of their acid addition salts which is also included in the invention. Thus, for example, basic, neutral or mixed salts and, where relevant, also hemihydrates, monohydrates, sesquihydrates or polyhydrates thereof can be obtained. The acid addition salts of the new compounds can be converted into the free compound in a manner which is in itself known, for example by means of basic agents, such as alkalis or ion exchangers. On the other hand, the free bases obtained can form salts with organic or inorganic acids. In particular, acids which are suitable for forming therapeutically usable salts are employed to manufacture acid addition salts. As examples of such acids there may be mentioned: Hydrogen halide acids, sulphuric acids, phosphoric acids, nitric acid, fumaric acid, aliphatic, alicyclic aromatic or heterocyclic carboxylic acids or sulphonic acids, such as formic acid, acetic acid, propionic acid, succinic acid, glycollic acid, lactic acid, malic acid, tartaric acid, citric acid, ascorbic acid, maleic acid or pyruvic acid, benzoic acid, anthranilic acid, p-hydroxybenzoic acid, salicylic acid or embonic acid, methanesulphonic acid, ethanesulphonic acid, hydroxyethanesulphonic acid, ethylenesulphonic acid, halogenobenzenesulphonic acids, toluenesulphonic acid, cyclohexylaminesulphonic acid or sulphanilic acid.

These or other salts of the new compounds such as, for example, the picrates can also serve for purification of the free bases obtained, by converting the free bases into salts, isolating these and again liberating the bases from the salts. Because of the close relationships between the new compounds in the free form and in the form of their salts, the free compounds are, in the preceding and following text, where appropriate also to be understood to include the corresponding salts, in respect of general sense and intended use.

The invention also relates to those embodiments of the process according to which a compound obtainable as an intermediate product at any stage of the process is used as the starting compound and the missing process steps are carried out, or the process is discontinued at any stage, or in which a starting material is formed under the reaction conditions or in which a reactant is present in the form of its salts, if appropriate.

Depending on the choice of the starting materials and procedures, the new compounds can be in the form of optical antipodes or racemates, or, if they contain at least two asymmetric carbon atoms, also as isomer mixtures (racemate mixtures).

Resulting isomer mixtures (racemate mixtures) can be separated into the two stereoisomeric (diastereomeric) pure racemates in a known manner on the basis of the physicochemical differences of the constituents, for example by chromatography and/or fractional crystallisation.

Resulting racemates can be resolved into the diastereomers according to known methods, for example by recrystallisation from an optically active solvent, by means of micro-organisms or by reaction with an optically active acid which forms salts with the racemic compound and separation of the salts obtained in this manner, for example on the basis of their different solubilities, and the antipodes can then be liberated by treatment with suitable agents. Particularly customary optically active acids are, for example, the D- and L-forms of tartaric acid, di-o-toluyltartaric acid, malic acid, mandelic acid, camphorsulphonic acid or quinic acid. Advantageously, the more active of the two antipodes is isolated.

Suitably, those starting materials are used for carrying out the reactions according to the invention which lead to the groups of end products which initially were mentioned particularly and especially to the end products which have been specially described or singled out.

The starting compounds are known or can, if they are new, be obtained according to methods which are in themselves known.

Thus, for example, the o-nitrobenzoic acid amides of the formula II mentioned as starting materials can be manufactured by first reacting a 5-(halogenosulphonyl)-2-nitro-benzoic acid with a di-lower alkylamine of the formula $(R_1)_2NH$ and then with a halogenating agent, such as a halide of phosphorous acid or sulphurous acid, of sulphuric acid or of phosphoric acid, for example with thionyl chloride, and condensing the resulting 5-(di-lower alkylsulphamoyl)-2-nitro-benzoyl halide with an amine of the formula IV in the usual manner, for example as described for the reaction of an amine of the formula IV with a functional derivative of a compound of the formula III.

The isatoic anhydrides of the formula III mentioned as starting materials can be manufactured, for example, by reacting a 5-sulphamoyl-anthranilic acid with a di-functional carbonic acid derivative, for example with a dihalide, diester or, in particular, ester-halide thereof, for example with chloroformic acid ethyl ester.

The starting compounds of the formula V, wherein $R_3$ is hydrogen can be manufactured, for example, by condensing a corresponding 5-sulphamoyl-anthranilic acid with a functional acetic acid derivative, for example with acetic anhydride, and reacting the resulting 6-sulphamoyl-2-methyl-4H-3,1-benzoxazin-4-one with an amine of the formula IV in the usual manner, for example as described above for the reaction with a functional derivative of an isatoic anhydride of the formula III, or by introducing $R_4$ into a 2-(X-amino-5-sulphamoyl-benzoic acid amide of the formula VII

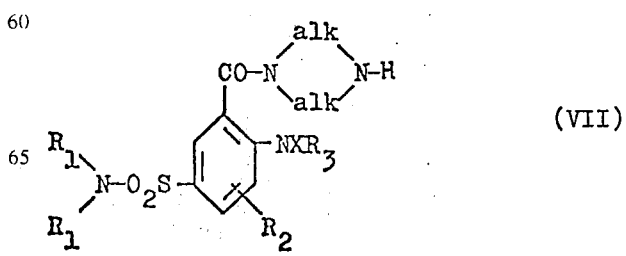

(VII)

in the usual manner.

The new compounds can be used as medicaments, for example in the form of pharmaceutical preparations in which they or their salts are present as a mixture with a pharmaceutical, organic or inorganic, solid or liquid excipient, which is suitable, for example, for enteral or parenteral administration. Possible materials for forming the excipient are those which do not react with the new compounds, such as, for example, water, gelatine, lactose, starch, magnesium stearate, talc, vegetable oils, benzyl alcohols, rubber, polyalkylene glycols, white petroleum jelly, cholesterol or other known medicinal excipients. The pharmaceutical preparations can be, for example, in the form of tablets, dragees, capsules, suppositories, ointments or creams or in the form of a liquid, as solutions (for example as an elixir or syrup), suspensions or emulsions. Optionally, they are sterilised and/or contain auxiliaries, such as preservatives, stabilisers, wetting agents or emulsifiers, salts for regulating the osmotic pressure or buffers. They can also contain yet further therapeutically valuable materials. The preparations, which can also be used in veterinary medicine, are formulated in accordance with customary methods. The recommended daily dose given orally to a warm-blooded animal weighing about 75 kg is about 15–350 mg.

The examples which follow illustrate the invention without however restricting it.

EXAMPLE 1

A suspension of 32.4 g of 5-(dimethylsulphamoyl)-isatoic anhydride in 150 ml of absolute toluene is warmed gently. As soon as the reaction mixture has reached 40°C, a solution of 22.2 g of 1-benzylpiperazine is added dropwise and the mixture is then warmed further, with complete solution occurring at about 75°C. The mixture is additionally heated for 1 hour to the refluxing temperature and evaporated to dryness under reduced pressure. The oily residue is dissolved in ethanol and an equivalent amount of ethanolic hydrochloric acid is added. 23.4 g of 1-[5-(dimethylsulphamoyl)-anthraniloyl]-4-benzylpiperazine hydrochloride of melting point 196°–198°C are thus obtained.

EXAMPLE 2

23.7 g of 5-(dimethylsulphamoyl)-isatoic anhydride in 180 ml of absolute dioxane are warmed to 80°C. A solution of 16.7 g of 1-($\beta$-phenyl)-ethyl-piperazine in 70 ml of absolute dioxane is then added dropwise, the whole is additionally heated for 1 hour to the reflux temperature and the reaction solution is evaporated to dryness under reduced pressure. The evaporation residue is recrystallised from isopropanol. 1-[5-(Dimethylsulphamoyl)-anthraniloyl]-4-($\beta$-phenylethyl)-piperazine of melting point 144°–5°C is thus obtained.

EXAMPLE 3

25.6 g of 1-[(5-dimethylsulphamoyl-2-acetamido)-benzoyl]-4-(2-phenylpropyl)-piperazine in 250 ml of methanol, 100 ml of chloroform and 200 ml of 2 N sodium hydroxide solution are warmed to 70°C, whereupon solution occurs. The two-phase system formed is concentrated in vacuo to remove the chloroform. The resulting suspension is next left for some time at room temperature and is then warmed to 50°–60°C for 1 hour. It is concentrated to about one-third in vacuo and the suspension is allowed to cool. The precipitate which separates out is filtered off and dissolved in ethylene chloride. The solution is dried over sodium sulphate, filtered and evaporated. The resulting material, in 1,000 ml of methanol, is additionally left to stand with 60 ml of 15 percent strength sodium hydroxide solution over the weekend and the mixture is then warmed to 60°C for 2 hours. The methanol is removed in vacuo. The aqueous phase is diluted with water and twice extracted with methylene chloride. The combined dried extracts give 15.7 g of a viscous yellow oil which is chromatographed on 300 g of silica gel. The eluate is recrystallised from isopropanol/petroleum ether. 1-[5-(Dimethylsulphamoyl)-anthraniloyl]-4-(2-phenylpropyl)-piperazine of melting point 100°–103°C is obtained.

The starting material can be manufactured as follows: 42.2 g of 1-[5-(dimethylsulphamoyl)-anthraniloyl]-4-benzyl-piperazine are suspended in 420 ml of acetic anhydride and left to stand over the weekend at room temperature. The suspension is evaporated to dryness in vacuo, the residue is dissolved in methylene chloride and the solution is successively washed with water, sodium carbonate solution and water. The dried methylene chloride solution is evaporated and the residue is recrystallised from chloroform-alcohol. 1-[5-(Dimethylsulphamoyl)-N-acetyl-anthraniloyl]-4-benzylpiperazine of melting point 174°–78°C is obtained. 34.7 g of this material in 350 ml of glacial acetic acid are subjected to hydrogenating debenzylation with hydrogen in the presence of palladium/charcoal at 20°–35°C. The reaction mixture is freed from the catalyst by filtration and is evaporated in vacuo. The residue is dissolved in water and the solution is rendered alkaline with sodium hydroxide solution and extracted with chloroform. The chloroform extracts are combined, dried and evaporated. The resulting crude 1-[5-(dimethyl-sulphamoyl)-N-acetyl-anthraniloyl]-piperazine is then reacted with 8.1 g of hydratropaldehyde and 3.4 g of 98–100 percent strength formic acid, an exothermic reaction taking place. The mixture is slowly heated, whereupon a homogeneous solution is formed. At about 100°C, evolution of gas commences; this has practically ceased after 5 minutes at 120°C. The mixture is heated at 120°C for a further 25 minutes and allowed to cool. The cooled reaction mixture is dissolved in methylene chloride and the resulting solution is washed with water. The organic phase is separated off, dried and evaporated. 1-[5-(Dimethylsulphamoyl-2-acetamido-benzoyl)]-4-(2-phenylpropyl)-piperazine is thus obtained in the form of tacky crystals and is further processed without additional purification.

EXAMPLE 4

7 g of 5-(dimethylsulphamoyl)-2-nitro-benzoic acid in 70 ml of thionyl chloride are heated to the boil for 3 hours. The excess thionyl chloride is removed in vacuo and the residue is recrystallised from ether-petroleum ether. 5-(Dimethylsulphamoyl)-2-nitro-benzoyl chloride of melting point 69°–70°C is obtained. This acid chloride is dissolved in 30 ml of absolute dioxane. A solution of 6 g of N-phenylethylpiperazine in 80 ml of absolute dioxane is then added dropwise thereto at about 10°C, whilst stirring, and the mixture is stirred overnight at room temperature. Water and sodium carbonate solution are successively added to the dioxane solution and the mixture is extracted with chloroform. The chloroform solution is dried and evaporated. The product is hydrogenated directly in 150 ml of ethanol in the presence of palladium on charcoal. 1-[5-

(Dimethylsulphamoyl)-anthraniloyl]-4-(β-phenylethyl)-piperazine of melting point 144°–5°C is thus obtained.

EXAMPLE 5

The following compounds can also be prepared analogously to the description in Examples 1 and 2: 1-[5-(Dimethylsulphamoyl)-anthraniloyl]-4-[β-(m-chlorophenyl)-ethyl]-piperazine; 1-[5-(dimethylsulphamoyl)-anthraniloyl]-4-(3-phenylpropyl)-piperazine, melting point 130°–137°C; 1-[5-(dimethylsulphamoyl)-anthraniloyl]-4-[β-(p-chlorophenyl)-ethyl]-piperazine, melting point 80°–82°C; 1-[5-(dimethylsulphamoyl)-anthraniloyl]-4-[β-(p-methoxyphenyl)-ethyl]-piperazine, melting point 138°C; 1-[5-(dimethylsulphamoyl)-anthraniloyl]-4-(3-phenyl-prop-2-en-1-yl)-piperazine, melting point 173°–6°C; 1-[5-(dimethylsulphamoyl)-anthraniloyl]-4-[β-(2-pyridyl)-ethyl]-piperazine, melting point 176°C (with decomposition); 1-[5-(dimethylsulphamoyl)-anthraniloyl]-4-[3-(2-pyridyl)-propyl]-piperazine, 1-[5-(dimethylsulphamoyl)-anthraniloyl]-4-[β-(4-pyridyl)-ethyl]-piperazine, melting point 95°–100°C; 1-[5-(dimethylsulphamoyl)-anthraniloyl]-4-[3-(3-pyridyl)-propyl]-piperazine and 1-[5-(dimethylsulphamoyl)-anthraniloyl]-4-[β-(p-fluorophenyl)-ethyl]-piperazine.

EXAMPLE 6

Tablets containing 250 mg of active compound can be prepared to have, for example, the following composition:

| Composition per tablet | |
|---|---|
| 1-[5-(Dimethylsulphamoyl)-anthraniloyl]-4-[β-phenylethyl)-piperazine | 250.0 mg |
| Mannitol | 60.0 mg |
| Wheat starch | 91.0 mg |
| Gelatine | 4.0 mg |
| Talc | 13.0 mg |
| Magnesium stearate | 2.0 mg |
| | 420.0 mg |

MANUFACTURE

The 1-[5-(dimethylsulphamoyl)-anthraniloyl]-4-(β-phenylethyl)-piperazine or a salt, for example the hydrochloride, thereof, is mixed with the mannitol and a part of the wheat starch and the mixture is forced through a sieve. The gelatine is dissolved in a 5-fold amount of water on a water bath and the powder mixture is kneaded with the solution until a plastic mass has been produced. The mass is forced through a sieve of approx. 3 mm mesh width and dried and the dried granules are again forced through a sieve. The remaining wheat starch, talc and magnesium stearate are then admixed. The resulting mixture is pressed to give tablets weighing 420 mg (and having a breaking groove).

What we claim is:

1. A 2-amino-5-sulphamoyl-benzoic acid amide of the formula

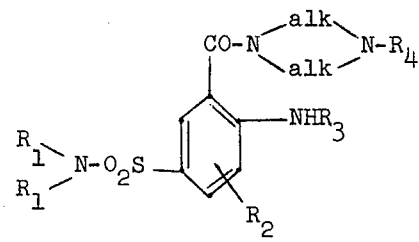

wherein $R_1$ denotes lower alkyl of 1–4 carbon atoms, $R_2$ denotes hydrogen, halogen, trifluoromethyl, lower alkyl of 1–4 carbon atoms or lower alkoxy of 1–4 carbon atoms, $R_3$ denotes hydrogen, hydroxyl or lower alkyl of 1–4 carbon atoms, $R_4$ denotes $R_5$-$C_1$-$C_4$-alkyl, $R_5$-$C_2$-$C_4$-alkenyl, $R_5$ denotes phenyl, phenyl monosubstituted by $C_1$-$C_4$-alkyl, $C_1$-$C_4$-alkoxy, halogen or trifluoromethyl, pyridyl or pyridyl monosubstituted by $C_1$-$C_4$-alkyl or $C_1$-$C_4$-alkoxy, and alk denotes 1,2-alkylene having up to 4 carbon atoms.

2. The compound of claim 1 wherein $R_1$ is methyl, $R_2$ is hydrogen, $R_3$ is hydrogen, ethyl or methyl, $R_4$ denotes $R_5$-methyl, 3-$R_5$-propyl, 2-$R_5$-ethyl, 2-methyl-2-$R_5$-ethyl or 3-$R_5$-prop-2-enyl, wherein $R_5$ is defined as in claim 1, and alk is propylene-1,2 or ethylene.

3. The compound of claim 1 wherein $R_1$ is methyl, $R_2$ is hydrogen, $R_3$ is hydrogen or ethyl, $R_4$ denotes $R_5$-methyl, 3-$R_5$-propyl, 2-$R_5$-ethyl, 2-methyl-2-$R_5$-ethyl or 3-$R_5$-prop-2-enyl, wherein $R_5$ denotes phenyl, phenyl monosubstituted by $C_1$-$C_4$-alkoxy or halogen, pyridyl or pyridyl monosubstituted by $C_1$-$C_4$-alkoxy or halogen, and alk is ethylene.

4. The compound of claim 1 wherein $R_1$ is methyl, $R_2$ is hydrogen, $R_3$ is hydrogen or ethyl, $R_4$ denotes 2-$R_5$-ethyl, 2-methyl-2-$R_5$-ethyl or 3-$R_5$-prop-2-enyl, wherein $R_5$ denotes phenyl or phenyl monosubstituted by $C_1$-$C_4$-alkoxy, pyridyl, pyridyl monosubstituted by $C_1$-$C_4$-alkoxy and alk is ethylene.

5. The compound of claim 1 which is 1-[5-(dimethylsulfamoyl)-anthaniloyl]-4-(3-phenyl-prop-2-en-1-yl).

6. The compound of claim 1 which is 1-[5-(dimethylsulphamoyl)-anthraniloyl]-4-benzyl-piperazine.

7. The compound of claim 1 which is 1-[5-(dimethylsulphamoyl)-anthraniloyl]-4-(β-phenyl-ethyl)-piperazine.

8. The compound of claim 1 which is 1-[5-(dimethylsulphamoyl)-anthraniloyl]-4-(2-phenyl-propyl)-piperazine.

9. The compound of claim 1 which is 1-[5-(dimethylsulphamoyl)-anthraniloyl]-4-(3-phenyl-propyl)-piperazine.

10. The compound of claim 1 which is 1-[5-(dimethylsulphamoyl)-anthraniloyl]-4-[β-(p-chlorophenylethyl]piperazine.

11. The compound of claim 1 which is 1-[5-(dimethylsulphamoyl)-anthraniloyl]-4-[β-(p-methoxyphenylethyl]-piperazine.

12. The compound of claim 1 which is 1-[5-dimethylsulphamoyl)-anthraniloyl]-4-[β-(2-pyridyl)-ethyl]-piperazine.

13. The compound of claim 1 which is 1-[5-(dimethylsulphamoyl)-anthraniloyl]-4-[3-(2-pyridyl)-propyl]-piperazine.

14. The compound of claim 1 which is 1-[5-(dimethylsulphamoyl)-anthraniloyl]-4-[3-(3-pyridyl)-propyl]-piperazine.

15. The compound of claim 1 which is 1-[5-(dimethylsulphamoyl)-anthraniloyl]-4-[β-(4-pyridyl)-ethyl]-piperazine.

16. The compound of claim 1 which is 1-[5-(dimethylsulphamoyl)-anthraniloyl]-4-[β-(m-chlorophenyl)-ethyl]-piperazine.

17. The compound of claim 1 which is 1-[5-(dimethylsulphamoyl)-anthraniloyl]-4-[β-(p-fluorophenyl)-ethyl]-piperanzine.

* * * * *